(12) United States Patent
Miyata et al.

(10) Patent No.: US 6,765,055 B2
(45) Date of Patent: Jul. 20, 2004

(54) ADHESION PROMOTER FOR A PRIMER AND PRIMER COMPOSITION

(75) Inventors: Akihiro Miyata, Kanagawa (JP); Kazunori Ishikawa, Kanagawa (JP); Hideyuki Matsuda, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 69 days.

(21) Appl. No.: 09/920,712

(22) Filed: Aug. 3, 2001

(65) Prior Publication Data

US 2002/0037964 A1 Mar. 28, 2002

(30) Foreign Application Priority Data

Aug. 8, 2000 (JP) ........................................ 2000-239446

(51) Int. Cl.$^7$ ........................... C08K 5/544; C08K 5/54; C07F 7/10

(52) U.S. Cl. ........................... 524/588; 528/25; 528/28; 528/38; 528/43

(58) Field of Search ............................ 524/588; 528/25, 528/28, 38.43; 556/413, 418, 419, 421, 424

(56) References Cited

U.S. PATENT DOCUMENTS

| | | | | | |
|---|---|---|---|---|---|
| 3,895,043 A | * | 7/1975 | Wagner et al. | ............... | 556/416 |
| 4,049,691 A | * | 9/1977 | Meiller | ................ | 556/423 |
| 4,474,933 A | * | 10/1984 | Huber et al. | ............... | 528/26 |
| 4,625,012 A | * | 11/1986 | Rizk et al. | ............... | 528/28 |
| 5,623,044 A | * | 4/1997 | Chiao | ............... | 528/28 |
| 6,350,799 B1 | * | 2/2002 | Wang | ............... | 524/188 |

FOREIGN PATENT DOCUMENTS

| | | | | |
|---|---|---|---|---|
| EP | 676403 A1 | * 10/1995 | ............. | C07F/7/18 |
| JP | 05-222342 | 8/1993 | | |

\* cited by examiner

Primary Examiner—Jeffrey B. Robertson
(74) Attorney, Agent, or Firm—Finnegan, Henderson, Farabow, Garrett & Dunner, L.L.P.

(57) ABSTRACT

An adhesion promoter for a primer, comprising a silane compound that is a reaction product between a polyisocyanate and a silane coupling agent having a secondary amino group, the nitrogen atom of which is directly connected to a phenyl group or a derivative thereof, the silane compound having in average one or more NCO group and in average one or more hydrolyzable alkoxysilyl group in the molecule. Also, a primer composition comprising the adhesion promoter for a primer and a film forming resin is disclosed. The adhesion promoter has high adhesion to various adherends and retains that effect after prolonged storage and the primer composition is excellent in adhesion to various adherends and retains adhesion after prolonged storage.

4 Claims, No Drawings

ADHESION PROMOTER FOR A PRIMER AND PRIMER COMPOSITION

BACKGROUND OF THE INVENTION

1. Field of the Invention

The present invention relates to an adhesion promoter for a primer and to a primer composition containing such an adhesion promoter. More particularly, the present invention relates to an adhesion promoter that has high adhesion to various adherends and retains that effect when it is stored for a long time and to a primer composition that is excellent in adhesion to various adherends and of which a reduction in adhesion is prevented.

2. Description of the Related Art

Generally, bonding of window glasses of an automobile requires excellent initial adhesion, high adhesion strength and adhesion durability under various conditions of low temperature, high temperature, high humidity and the like. Further, it is very important that after window glasses were bonded, they have excellent weatherability (including weatherability to light, i.e., resistance to light) since the window glasses of an automobile directly contact open air and directly receive sunbeam.

A typical example of sealants useful for bonding nonporous substrates such as glass is a urethane based sealant. However, when bonding a glass substrate to a metal with a urethane based sealant (for example, incorporating window glasses in the production of automobiles), it may sometimes happen that the stack shear strength of bonded substrates will not reach safety target or structure target, so that in most body assembly operations the coating of a sealant is generally preceded by the coating of a primer in bonding a front window glass or rear window glass.

As the primer, a composition containing a binder component such as polyester polyurethane or acrylic resin, have been conventionally used in combination with an adhesion promoter such as silane coupling agent, polyisocyanate, carbon black, catalyst and the like.

As the adhesion promoter, mention may be made of, for example, isocyanate group containing silane compounds obtained by reacting an organic polyisocyanate with an amino silane compound or mercaptosilane compound, disclosed in Japanese Patent Application Laid-open No. Hei 5-222342. According to the teaching of the publication, this compound is obtained by reacting an NCO group of organic polyisocyanate with an amino group or a mercapto group in a ratio of from 1/0.20 to 1/0.95 and the primer composition containing the compound has high initial adhesion and excellent durability.

However, the reaction of the NCO groups of organic polyisocyanate with the mercapto groups of mercaptosilane or amino groups of aminosilane generates thiourethane groups and urea groups. These groups contain activated hydrogen, which is highly reactive with unreacted NCO groups in the molecule of the resulting isocyanate group-containing silane compound. As a result, when it is stored for a long time, the isocyanate group-containing silane compound will have a deteriorated activity and it has been difficult to use it in combination with a catalyst such as an organotin compound or tertiary amine to be added in order to increase the curability thereof.

SUMMARY OF THE INVENTION

An object of the present invention is to provide an adhesion promoter for a primer that has high adhesion to various adherends and retains that effect when it is stored for a long time.

Another object of the present invention is to provide a primer composition that contains such an adhesion promoter and has excellent adhesion and storage stability.

The present inventors have made extensive study with a view to overcoming the problems of the prior art adhesion promoter and primer composition and provide a novel adhesion promoter and primer composition. As a result, they have found that in a reaction between an NCO group of polyisocyanate and an amino group of aminosilane to generate a urea group when preparing a compound usable as an adhesion promoter for a primer, the reactivity of active hydrogen in the resultant urea group is inhibited if the amino group of amino silane has a phenyl group as a substituent, and that the adhesion of the resultant primer composition containing such an adhesion promoter is not deteriorated after prolonged storage. The present invention is based on this discovery.

That is, in a first aspect, the present invention provides an adhesion promoter for a primer, comprising a silane compound that is a reaction product between a polyisocyanate and a silane coupling agent having a secondary amino group the nitrogen atom of which is directly connected to a phenyl group or a derivative thereof, the silane compound having in average at least one NCO group and in average at least one hydrolyzable alkoxysilyl group in the molecule.

Here, the polyisocyanate is preferably an aliphatic or alicyclic polyisocyanate.

In the adhesion promoter for a primer mentioned above, the silane compound is preferably a reaction product having a reaction ratio of NCO/NH=3/1 to 3/2.

In a second aspect, the present invention provides a primer composition comprising the adhesion promoter mentioned above and a film forming resin.

DETAILED DESCRIPTION OF THE INVENTION

Hereinafter, the present invention will be described in detail.

The adhesion promoter for a primer according to the present invention is a reaction product between a polyisocyanate and a silane coupling agent having a secondary amino group the nitrogen atom of which is directly connected to a phenyl group or a derivative thereof. The silane compound has in average one or more NCO group and in average one or more hydrolyzable alkoxysilyl group in the molecule.

In the present invention, the polyisocyanate that can be used is not particularly limited and specific examples thereof include ethylene diisocyanate, propylene diisocyanate, tetramethylene diisocyanate, hexamethylene diisocyanate (MDI), or compounds with a lysine skeleton, such as lysine diisocyanate and lysine triisocyanate, xylylene diisocyanate (XDI), isophorone diisocyanate, $H_6$ XDI (hydrogenated XDI), $H_{12}$ MDI (hydrogenated MDI), and carbodiimide modified products of these polyisocyanates or isocyanurate modified products thereof. They may be used singly or two or more of them may be used in admixture.

Among these, hexamethylene diisocyanate, lysine diisocyanate, lysine triisocyanate, xylylene diisocyanate, and $H_6$ XDI are preferred since they give rise to reaction products that have high tackifying property.

Here, lysine diisocyanate and lysine triisocyanate are compounds represented by the following formulae:

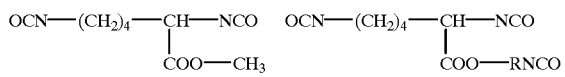

wherein R represents an alkylene group having 1 to 8 carbon atoms that may be branched, preferred examples of which include a methylene group, an ethylene group, a trimethylene group, a propylene group, a tetramethylene group, a pentamethylene group, a hexamethylene group, a heptamethylene group, an octamethylene group and the like.

The term aliphatic polyisocyanate as used herein refers to those compounds in which NCO groups are bonded to aliphatic carbon atoms and also includes, for example, a compound such as XDI having a benzene ring.

In the present invention, the silane coupling agent having a secondary amino group to which a phenyl group or its derivative is bonded directly to the nitrogen atom thereof has a compound of the structure shown by the following formula (1).

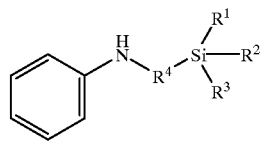

In the formula (1) above, $R^1$, $R^2$, and $R^3$ independently represent a hydrolyzable group or an alkyl group, at least one of which is a hydrolyzable group. The compounds of formula (1) that have two or three hydrolyzable groups bonded to the silyl group are preferred since the silane compound of the present invention of this type has an increased tackifying property. More preferred are those compounds in which all of $R^1$, $R^2$, and $R^3$ are hydrolyzable groups. Appropriate selection of $R^1$, $R^2$, and $R^3$ can adjust the hydrolysis rate and adhesion development time depending on the purpose. Specific examples of the hydrolyzable group include a hydrogen atom, an alkoxy group, an acyloxy group, a ketoximate group, an amino group, an amido group, an aminooxy group, a mercapto group, an alkenyloxy group and the like. Among these, an alkoxy group, which is mildly hydrolyzable, is preferred. A methoxy group is particularly preferred since it is easily available.

The alkyl group is preferably a straight or branched alkyl group having 1 to 8 carbon atoms, for example, a methyl group, an ethyl group, a propyl group, an isopropyl group, a butyl group, an isobutyl group, a sec-butyl group, a tert-butyl group, a pentyl group, an isopentyl group, a neopentyl group, a tert-pentyl group, a 1-methylbutyl group, a 2-methylbutyl group, a 1,2-dimethylpropyl group and the like. Groups that correspond to the groups above but contain a double bond or triple bond may also be used. Among the groups mentioned above, a methyl group is more preferable.

$R^4$ represents an alkylene group having 1 to 12 carbon atoms, preferably a methylene group, an ethylene group, a trimethylene group, a tetramethylene group, a pentamethylene group or the like, with a trimethylene group being more preferred since it can give excellent adhesion.

The phenyl group bonded to the nitrogen atom of the secondary amino group may be a phenyl derivative having one or more substituents. Preferred examples of the substituent include an alkyl group such as a methyl group or an ethyl group, an alkoxy group such as a methoxy group or an ethoxy group, and a halogen atom such as a fluorine atom or a chlorine atom.

The silane coupling of the present invention having the above-mentioned structure may preferably include, for example, γ-anilinopropyltrimethoxysilane.

The silane compound of the present invention can be obtained by reacting an NCO group of the polyisocyanate with an NH group of the secondary amino group in the silane coupling agent mentioned above. Hereinafter, an example of reaction scheme for the silane compound of the present invention will be described.

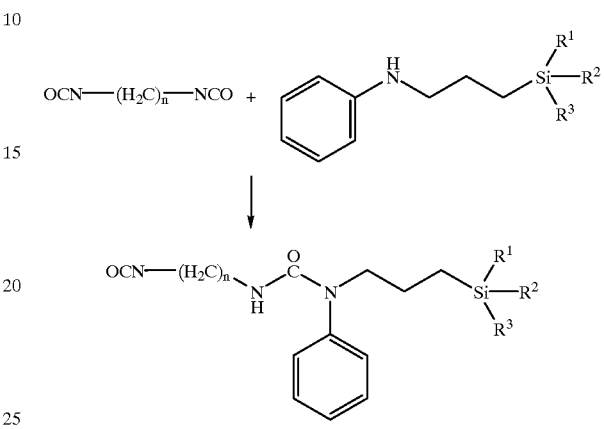

Here, n is an integer of 1 to 18.

As shown in the above reaction scheme, a polyisocyanate such as hexamethylene diisocyanate and a silane coupling agent such as γ-anilinopropyltrimethoxysilane are mixed in a solvent such as ethyl acetate or in the absence of solvents and the mixture is stirred for about 1 to about 3 hours to produce the silane compound of the present invention. Preferably, the reaction is performed at ambient temperature. In this case, catalysts are not mandatory but a reaction in the presence of a catalyst such as stannous octoate can reduce the reaction time.

In this reaction, the reaction ratio of the polyisocyanate to the silane coupling agent is preferably such that the ratio of NCO group of the polyisocyanate to the NH group of the silane coupling agent is in a ratio of NCO/NH=3/1 to 3/2. The silane compound of the present invention that has been obtained by the reaction at this reaction ratios of reactants contains in average one or more NCO group and in average one or more hydrolyzable alkoxysilyl group in the molecule. Since it has the both reactive functional groups in the molecule, the silane compound of the present invention is considered to give an increased tackifying effect.

The above reaction generates a urea group. It has hitherto been difficult to store the resultant silane compound for a long time without any deterioration in activity due to the high reactivity of active hydrogen of the urea group. On the contrary, in the silane compound of the present invention, a phenyl group or its derivative directly bonded to the nitrogen atom inhibits the reactivity of active hydrogen of the generated urea group due to its steric hindrance and electron attracting effect, so that the silane compound will not have a damaged activity after a prolonged storage and can impart high adhesion and hence it can be advantageously used as an adhesion promoter for a primer.

After its production, the silane compound of the present invention thus obtained may be subjected to evaporation of the reaction solvent and purification before it can be blended into a primer composition. However, no substantial difference is obtained if the purification step is omitted and the silane compound is used together with the reaction solvent. To do so rather improves workability.

The film forming resin to be mixed with the silane compound of the present invention is not particularly limited as far as it contains no active hydrogen that is highly reactive with the NCO groups present in the molecule of the silane compound. Known urethane-, acrylic-, vinyl chloride-, and fluorine-based film forming resins may be used.

The urethane-based film forming resin can be obtained by reaction of an aliphatic-, alicyclic- or aromatic-based polyisocyanate with a compound having an active hydrogen such as a polyether polyol, a polyester polyol, a polymer polyol, or a polyamine.

The polyether polyol can be obtained by addition polymerization of an alkylene oxide such as ethylene oxide, propylene oxide, tetrahydrofuran or mixtures thereof with a compound having two or more active hydrogens, for example, polyhydric alcohols such as ethylene glycol, glycerol, or trimethylolpropane, amines such as ethylenediamine, ethanolamine, or propanolamine, or polyhydric phenols such as resorcinol or bisphenol, or the like.

The polyester polyol includes condensates of the polyhydric alcohol mentioned above with a polybasic carboxylic acid or hydroxycarboxylic acid, and lactone polymers.

The polybasic carboxylic acid includes adipic acid, glutaric acid, fumaric acid, maleic acid, pyromellitic acid and the like. As the condensate of hydroxycarboxylic acid and polyhydric alcohol, there can be used castor oil, reaction products of castor oil and ethylene glycol, reaction products of castor oil and propylene glycol, and the like. The lactone polymer includes those polymers obtained by ring open polymerization of propionolactone, caprolactone, valerolactone or the like with a suitable polymerization initiator.

The polymer polyol includes, for example, the polyether polyol or polyester polyol mentioned above graft polymerized with an ethylenically unsaturated compound such as acrylonitrile, styrene, or methyl (meth)acrylate, and 1,2- or 1,4-polybutadiene polyol or hydrogenated products thereof.

These polyhydroxyl compounds may be used singly or two or more of them may be used in admixture.

The polyisocyanate includes the same compounds as exemplified in the silane compound. These compounds may be used singly or two or more of them may be used in admixture.

The method for producing urethane-based film forming resin is not particularly limited and commonly used production methods therefor may be used.

The acrylic-based film forming resin can be obtained by copolymerizing one or more nonfunctional monomers such as acrylic acid esters or methacrylic acid esters and optionally a monomer having a functional group such as an alkoxysilyl group.

The nonfunctional monomer is not particularly limited and any known one may be used. Examples thereof include methyl (meth)acrylate, ethyl (meth)acrylate, propyl (meth)acrylate, butyl (meth)acrylate, isobutyl (meth) acrylate, t-butyl (meth)acrylate, 2-ethylhexyl (meth)acrylate, octyl (meth)acrylate, and the like.

Also, the functional monomer is not particularly limited and any known functional monomer may be used. For example, mention may be made of glycidyl methacrylate, trimethoxysilylpropyl methacrylate or the like. Also, those monomers having two or more polymerizable double bonds in the molecule, such as ethylene dimethacrylate, diethylene glycol dimethacrylate, triethylene glycol dimethacrylate, 1,3-butylene dimethacrylate, may be used. Copolymerization of such a monomer with a nonfunctional monomer can produce polymers having a crosslinked structure. The functional monomers may be copolymerized with other vinyl monomers or radical polymerizable vinyl monomers as far as the object of the present invention is not damaged.

The method for producing acrylic-based film forming resin is not particularly limited. For example, the acrylic-based film forming resin may be produced by a commonly used polymerization method using a peroxide or azo compound as a polymerization initiator.

The vinyl chloride based film forming resin includes, for example, vinyl chloride solution-based, vinyl chloride sol-based, and vinyl chloride laminate-based film forming resins. The fluorine-based film forming resin includes, for example, PVdF type film forming resin comprising polyethylene difluoride and fluoroolefin alkyl vinyl ether copolymer type comprising an alternate copolymer of a fluoroolefin and an alkyl vinyl ether.

In the primer composition of the present invention, the film forming resin is contained in an amount of preferably 5 to 150 parts by weight, more preferably 10 to 100 parts by weight, per 100 parts by weight of the silane compound.

The primer composition of the present invention contains 5 to 95% by weight of an organic solvent based on the total weight of the composition. The organic solvent is inert to the film forming resin and silane compound mentioned above and preferably has a suitable volatility. In the case where the silane compound together with the reaction solvent is mixed with the other reactant(s), a silane compound that has good compatibility with the reaction solvent is selected so as to adjust the blending amount of the organic solvent contained in the whole composition in the above-mentioned range. The organic solvent used in the present invention includes, for example, ethyl acetate, methyl ethyl ketone, butyl acetate, cellosolve acetate, mineral spirit, toluene, xylene, dimethylacetamide, acetone, n-hexane, methylene chloride, tetrahydrofuran, ethyl ether, dioxane and the like as well as mixtures thereof. Among these, ethyl acetate, methyl ethyl ketone and mixtures thereof are preferable. When using the organic solvents, it is preferred that they be sufficiently dried or dehydrated before they can be mixed with the other components.

The primer composition of the present invention may contain carbon black. Since carbon black shields or absorbs ultraviolet rays and visible lights, blending carbon black can impart weatherability to the primer composition. The carbon black that can be used in the present invention is not particularly limited and N110, N220, N330, N550, N770 as specified by American Society of Testing Materials and mixtures thereof may be used. The blending amount of carbon black is preferably 5 to 300 parts by weight, more preferably 20 to 200 parts by weight, per 100 parts by weight of the silane compound. In this range, carbon black has good compatibility with the film forming resin and can secure good dispensability in the composition.

The primer composition of the present invention may contain a curing catalyst. Conventionally, blending a curing catalyst in order to increase the curability of the composition has led to a decrease in adhesion during storage. On the contrary, use of the silane compound of the present invention can overcome such a problem and the adhesion of the resultant composition is not deteriorated after a prolonged storage. The curing catalyst used in the present invention is not particularly limited as far as it is commonly used and includes, for example, amine-based catalysts such as triethylenediamine, pentamethylenediethylenetriamine, morpholine-based amine, and triethylamine, tin-based catalysts such as di-n-octyltin dilaurate, dibutyltin dilaurate, and stannous octoate. Preferably, the primer composition contains the catalyst in an amount of 0.005 to 0.5 parts by weight per 100 parts by weight of the silane compound.

The primer composition of the present invention may contain a water absorbing agent for the purpose of further increasing the storage stability. The water absorbing agent includes, for example, zeolite-based water absorbing agents such as synthetic or natural zeolites. Commercially available preparation includes Baylit L powder produced by Bayer, Molecular Sieve produced by Union Carbide, Zeolam produced by Tosoh Corp. The water absorbing agent may be either soluble or insoluble in the primer composition of the present invention. If it is insoluble in the primer composition it may be coexist therein.

Further, the primer composition of the present invention may contain various additives for the purpose of further increasing weatherability or workability. For example, blending inorganic pigments such as lamp black, titanium white, red oxide, titanium yellow, Chinese white, red lead, cobalt blue, iron black, and aluminum powder, organic dyes or pigments such as Neo Zabon Black RE, Neo Black RE, Orazole Black CN, Orazole Black Ba (all produced by Ciba-Geigy), Spiron Blue 2BH (produced by Hodogaya Chemical Co., Ltd.) or ultraviolet absorbents such as Cyasorb (Cyasorb UV24 Light Absorber, produced by American Cyanamide) and Uvinul (Uvinul D-49, D-50, N-35, and N-539, produced by General Aniline) shields or absorbs ultraviolet rays or visible rays and is effective for increasing the light resistance of the composition. Furthermore, the primer composition of the present invention may contain fillers such as glass powder, clay, powdered silica gel, ultrafine powdery silicic acid, and molecular sieves (this also having water absorbing ability), adhesion promoters, and plasticizers intended to give flexibility to the primer film and increasing the adhesion strength, such as butyl benzyl phthalate, dioctyl phthalate, dibutyl phthalate, and paraffin chloride.

The method for producing the primer composition of the present invention is not particularly limited. For example, it is prepared by appropriately dissolving a film forming resin, a silane compound, carbon black, and other additive or additives in an organic solvent in a reactor and sufficiently kneading using a mixer such as ball mill to effect uniform dispersion.

The primer composition of the present invention obtained as described above retains excellent adhesion after prolonged storage and has high adhesion to various adherends such as glass, aluminum plates, coated steel plates, ceramics and the like. The composition having such properties is suitable as a primer to be coated on the surface of a nonporous substrate particularly when a urethane-based sealant for fixing glass of automobile is used.

EXAMPLES

Hereinafter, the present invention will be described in more detail by examples. However, the present invention should not be construed as being limited thereto.

Synthesis of Silane Compounds S01 to S04

(1) Synthesis of Silane Compound S01

168 g of hexamethylene diisocyanate (HDI, produced by Sumitomo Bayer Urethane Co., Ltd.) and 255 g of γ-anilinopropyltrimethoxysilane (produced by Nippon Unicar Co., Ltd.) were dissolved in 106 g of ethyl acetate and the resultant solution was stirred in the presence of stannous octoate at ambient temperature for about 3 hours. Ethyl acetate was added to the reaction product to adjust the concentration of the solution to 50.0% by weight.

(2) Synthesis of Silane Compound S02

272 g of lysine triiocyanate (i.e., a compound of the formula mentioned above in which R is an ethylene group (—$(CH_2)_2$—), NCO%: 46.3%, LTI, produced by Kyowa Hakko Co., Ltd.) and 255 g of γ-anilinopropyltrimethoxysilane were dissolved in 132 g of ethyl acetate and the solution was reacted in the same manner as above to obtain a solution of Silane Compound S02 in a concentration of 50.0% by weight (here, NCO % represents % by weight of the NCO group in lysine triisocyanate).

(3) Synthesis of Silane Compound S03

168 g of HDI and 196 g of γ-mercaptopropyltrimethoxysilane (produced by Nippon Unicar Co., Ltd.) were dissolved in 91 g of ethyl acetate and the resultant solution was reacted in the same manner as above to obtain Silane Compound S03 in a concentration of 50.0% by weight.

(4) Synthesis of Silane Compound S04

168 g of HDI and 179 g of γ-aminopropyltrimethoxysilane (produced by Nippon Unicar Co., Ltd.) were dissolved in 87 g of ethyl acetate and the resultant solution was reacted in the same manner as above to obtain Silane Compound S04 in a concentration of 50.0% by weight.

The reaction ratios of NCO groups to NH groups or SH groups in Silane Compounds S01 to S04 are shown in Table 1.

TABLE 1

| Silane Compound | NCO/NHorSH |
|---|---|
| S01 | 2/1 |
| S02 | 3/1 |
| S03 | 2/1 |
| S04 | 2/1 |

Examples 1 to 3

Silane Compound S01 or S02, acrylic resin (Zemlac YC3623 produced by Kanegafuchi Chemical Industry Co., Ltd.), carbon black, stannous octoate, and ethyl acetate were mixed in the formulations shown in Table 2, and each mixture was sufficiently kneaded using a ball mill to prepare primer compositions.

Comparative Examples 1 and 2

Primer compositions were prepared in the same manner as in Examples 1 to 3 except that Silane Compound S03 or S04, the nitrogen atom of which is not connected to a phenyl group, were used instead of Silane Compound S01 or S02.

The primer compositions obtained in Examples 1 to 3 and Comparative Examples 1 and 2 were subjected to the following adhesion tests and adhesion thereof was evaluated.

Adhesion Test

Immediately after the preparing, the primer compositions were each coated on an organic glass (in Tables, referred to as SiH/C) having a silicone hard coat or a float glass having no surface treatment to a coated area of 12 cm×2.5 cm. On this was pressed a urethane sealant (WS-95, produced by Yokohama Rubber Co., Ltd.) to obtain Specimen A.

On the other hand, Specimen B was prepared in the same manner as Specimen A except that the primer composition was stored at 60° C. for 2 weeks in a sealed state before the coating.

Test Example 1
Ambient Temperature Adhesion

Samples A and B were stored at 20° C. and relative humidity (RH) of 65% for 3 days or 7 days. Then, knife cut tests was performed and the state of the adhesion interface of each sample was observed.

The adhesion was evaluated in terms of a ratio (%) of the area where cohesive failure of the composition occurred to the area of coated surface. CF100 indicates that the composition caused cohesion failure all over the coated surface and no pealing occurred on the interface between the composition and the surface of the adherend.

Test Example 2
Water Resistance Adhesion

Samples A and B were stored at 20° C. and relative humidity (RH) of 65% for 7 days. Subsequently, they were immersed in a window washer solution diluted with water to 50% by weight at 20° C. for 168 hours (7 days). Then, adhesion of the samples was evaluated in the same manner as in Test Example 1 above.

Test Example 3
Low Temperature Adhesion

Samples A and B were stored at 5° C. and relative humidity (RH) of 50% for 3 days. Then, adhesion of the samples was evaluated in the same manner as in Test Example 1 above.

Table 2 below shows the results of evaluation in Test Examples 1 to 3.

plate and that these properties were not deteriorated after 2 week' storage (Examples 1 to 3). On the other hand, the compositions of Comparative Examples 1 and 2, which showed excellent adhesion immediately after the preparing, exhibited a considerable decrease in adhesion when stored for a long period. These results demonstrate that the adhesion promoter for a primer and primer composition of the present invention are excellent in that the tackifying effect of the silane compound of the present invention is retained after storage.

What is claimed is:

1. A primer composition comprising an adhesion promoter for a primer, said adhesion promoter being a silane compound that is a reaction product having a reaction ratio of NCO/NH of from 3/1 to 3/2 between a polyisocyanate and a silane coupling agent having a secondary amino group, the nitrogen atom of which is directly connected to a phenyl group or a derivative thereof, the silane compound having in average at least one NCO group and in average at least one hydrolysable alkoxysilyl group in the molecule, a film forming resin that contains no active hydrogen, and from 5 to 95% by weight of an organic solvent based on the total weight of the primer composition.

2. A primer composition according to claim 1, wherein the polyisocyanate is an aliphatic or alicyclic polyisocyanate.

3. A primer composition according to claim 1, wherein the film forming resin that contains no active hydrogen is a urethane-based film forming resin, an acrylic-based film forming resin, a vinyl chloride-based film forming resin or a fluorine-based film forming resin.

TABLE 2

| Silane Compound | NV. | | | Example 1 | Example 2 | Example 3 | Comparative Example 1 | Comparative Example 2 |
|---|---|---|---|---|---|---|---|---|
| | | | | (Part by weight) | | | | |
| S01 | 50.0% | | | 62.4 | 46.8 | | | |
| S02 | 50.0% | | | | | 62.4 | | |
| S03 | 50.0% | | | | | | 62.4 | |
| S04 | 50.0% | | | | | | | 62.4 |
| Acrylic resin | 50.0% | | | 11.6 | 11.6 | 11.6 | 11.6 | 11.6 |
| Carbon black | | | | 16.5 | 16.5 | 16.5 | 16.5 | 16.5 |
| Stannous octoate | | | | 0.02 | 0.02 | 0.02 | 0.02 | 0.02 |
| Ethyl acetate | | | | 47.1 | 47.1 | 47.1 | 47.1 | 47.1 |
| Adhesion after preparing | | | | | | | | |
| Float glass | 20° C. 65% RH | Day 3 | | CF100 | CF100 | CF100 | CF100 | CF100 |
| | | Day 7 | | CF100 | CF100 | CF100 | CF100 | CF100 |
| | 40° C. in water | Day 7 | | CF100 | CF100 | CF100 | CF100 | CF100 |
| | 5° C. | Day 3 | | CF100 | CF100 | CF100 | CF100 | CF100 |
| Aluminum plate | 20° C. 65% RH | Day 3 | | CF100 | CF100 | CF100 | CF100 | CF100 |
| | | Day 7 | | CF100 | CF100 | CF100 | CF100 | CF100 |
| | 40° C. in water | Day 7 | | CF100 | CF100 | CF100 | CF100 | CF100 |
| | 5° C. | Day 3 | | CF100 | CP100 | CF100 | CF100 | CF100 |
| Adhesion after storage | | | | | | | | |
| Float glass | 20° C. 65% RH | Day 3 | | CF100 | CF100 | CF100 | CF20 | CP40 |
| | | Day 7 | | CF100 | CF100 | CF100 | CF30 | CF50 |
| | 40° C. in water | Day 7 | | CF100 | CF100 | CF100 | CF80 | CF90 |
| | 5° C. | Day 3 | | CF100 | CF100 | CF100 | CF5 | CF20 |
| Aluminum plate | 20° C. 65% RH | Day 3 | | CF100 | CF100 | CF100 | CF15 | CF25 |
| | | Day 7 | | CF100 | CF100 | CF100 | CF30 | CF40 |
| | 40° C. in water | Day 7 | | CF100 | CF100 | CF100 | CF90 | CF90 |
| | 5° C. | Day 3 | | CF100 | CF100 | CF100 | CF15 | CF25 |

In the table, "NV" indicates weight concentration of the solids. From Table 2, it can be seen that the primer compositions of the present invention were excellent in all of ambient temperature adhesion, water resistance adhesion and low temperature adhesion to float glass and aluminum 4. A primer composition according to claim 1, wherein the primer composition has high adhesion and retains the higher adhesion after storage.

* * * * *